United States Patent
Penrose et al.

(10) Patent No.: US 11,217,121 B2
(45) Date of Patent: Jan. 4, 2022

(54) ENVIRONMENTALLY FRIENDLY HEAT TRANSFER LABEL

(71) Applicant: Illinois Tool Works Inc., Glenview, IL (US)

(72) Inventors: Nicholas W. Penrose, Amston, CT (US); Michael B. Colella, Southington, CT (US)

(73) Assignee: Illinois Tool Works Inc., Glenview, IL (US)

( * ) Notice: Subject to any disclaimer, the term of this patent is extended or adjusted under 35 U.S.C. 154(b) by 237 days.

(21) Appl. No.: 16/429,294

(22) Filed: Jun. 3, 2019

(65) Prior Publication Data

US 2019/0378438 A1    Dec. 12, 2019

Related U.S. Application Data

(60) Provisional application No. 62/684,003, filed on Jun. 12, 2018.

(51) Int. Cl.
*G09F 3/10* (2006.01)
*G09F 3/02* (2006.01)

(52) U.S. Cl.
CPC .................. *G09F 3/10* (2013.01); *G09F 3/02* (2013.01); *G09F 2003/025* (2013.01); *G09F 2003/0282* (2013.01)

(58) Field of Classification Search
CPC ........ G09F 3/10; G09F 3/02; G09F 2003/025; G09F 2003/0282; B44C 1/1712
See application file for complete search history.

(56) References Cited

U.S. PATENT DOCUMENTS

| | | | |
|---|---|---|---|
| 4,927,709 A | 5/1990 | Parker et al. | |
| 5,118,658 A * | 6/1992 | Egashira | B41M 5/395 428/423.1 |
| 5,908,694 A | 6/1999 | Makar et al. | |
| 5,919,834 A | 7/1999 | Downs et al. | |
| 8,507,616 B2 | 8/2013 | Yang et al. | |
| 2007/0009732 A1 | 1/2007 | Tsai et al. | |
| 2015/0064372 A1* | 3/2015 | Dinescu | G09F 3/10 428/32.69 |
| 2016/0009124 A1* | 1/2016 | Chiao | B44C 1/172 428/32.81 |

(Continued)

FOREIGN PATENT DOCUMENTS

| | | |
|---|---|---|
| CN | 1741862 A | 3/2006 |
| CN | 105705051 A | 6/2016 |

(Continued)

OTHER PUBLICATIONS

International Search Report and Written Opinion issued by ISA/EPO in connection to PCT/US2019/035410 dated Sep. 19, 2019.

(Continued)

*Primary Examiner* — Laura C Powers
(74) *Attorney, Agent, or Firm* — Levenfeld Pearlstein, LLC

(57) ABSTRACT

An environmentally friendly heat transfer label includes a carrier, a graphic layer including at least one ink layer formed from at least one substantially solid ink formulation, and an adhesive layer formed from a substantially solid heat activated adhesive formulation. The heat transfer label is configured to be substantially free of volatile organic compounds (VOC).

11 Claims, 2 Drawing Sheets

(56) References Cited

U.S. PATENT DOCUMENTS

2017/0247589 A1\* 8/2017 Branigan ............... C09J 167/07

FOREIGN PATENT DOCUMENTS

| CN | 105899370 A | 8/2016 |
| CN | 107075315 A | 8/2017 |
| GB | 1364119 A | 8/1974 |

OTHER PUBLICATIONS

International Preliminary Report on Patentability issued by International Bureau of WIPO in connection with PCT/US2019/035410 dated Dec. 24, 2020.

\* cited by examiner

ENVIRONMENTALLY FRIENDLY HEAT TRANSFER LABEL

CROSS-REFERENCE TO RELATED APPLICATION DATA

This application claims the benefit of and priority to Provisional U.S. Patent Application Ser. No. 62/684,003, filed Jun. 12, 2018, titled, Environmentally Friendly Heat Transfer Label, the disclosure of which is incorporated herein in its entirety.

BACKGROUND

The present disclosure generally relates to heat transfer labels, and more particularly to environmentally friendly heat transfer labels substantially free of volatile organic compounds (VOC).

Heat transfer labels are well known and used in various industries. For example, heat transfer labels are widely used in apparel industries. Typically, heat transfer labels require an adhesive layer to attach the label to a substrate. There are many types of inks which have been used to produce heat transfer labels. These include solvent based inks, water based inks, and UV curable inks. All of these ink types have drawbacks with respect to our environment. Solvent based inks are commonly used to print heat transfer labels, but require evaporation of solvents in the inks during printing processes to form dry ink layers. The solvents can contribute to pollution by emission of volatile organic compounds (VOC). Often, solvent capture technology and/or solvent destruction technology are required in operation to lower the amount of VOC emissions from the printing processes. Such technologies are often quite expensive to install and maintain.

There has been a movement away from solvent based inks to water based inks in an attempt to produce labels by a more environmentally friendly process. However, water based inks also require evaporation of water in the inks, which requires energy intensive processes involving heat and air flow to form dry ink layers. Further, water based ink systems are thought to be VOC free, but when tested for volatile organic compounds by procedures such as those outlined in ISO 16000-6, ISO 16000-9, and ISO 16000-25, many are found to contain varying amounts of VOC. Water based inks are considered more complex than solvent based inks requiring additional ingredients, such as drying retarders, coalescing agents, and dispersion stabilizers, some of which contain VOC and are included in the inks at surprisingly high levels. Further, efforts have been made to conserve water globally, and several of the larger apparel manufacturers have aggressive corporate targets to reduce their usage and consumption of water in their processes by as much as 20% over the next several years.

UV inks can be formulated as 100% solids and used to produce heat transfer labels as taught by Downs et. al. (U.S. Pat. No. 5,919,834.) However, the vast majority of UV polymerizable ingredients are modified acrylates and/or methacrylates, which produce polymers having an acrylate or methacrylate backbone that can limit final ink properties. Modifications to properties can be realized through incorporation of various functional groups as side chains, but the end polymer products are not as robust as other more inherently robust polymers, such as polyesters, polyurethanes, polyamides, and polyethers. Further, although UV ink formulations are thought of as being 100% solids, many include unreacted monomers and oligomers, as well as photointiator fragments in the final products, which may not be desirable.

Accordingly, there is a need for improved environmentally friendly heat transfer labels.

BRIEF SUMMARY

An environmentally friendly heat transfer label is provided according to various embodiments. The heat transfer label may comprise a graphic layer formed from a substantially solid ink formulation and an adhesive layer formed from a substantially solid heat activated adhesive formulation. The heat transfer label may be configured to give off substantially zero volatile organic compounds (VOC) during printing processes and during application of the label to a substrate. Further, components of the heat transfer label may be formed from environmentally friendly ingredients, such as those from biorenewable sources.

In one aspect, a heat transfer label configured to be substantially free of VOC is provided. The heat transfer label may comprise a carrier, a graphic layer including at least one ink layer formed from at least one substantially solid ink formulation, and an adhesive layer formed from a substantially solid heat activated adhesive formulation, wherein the graphic layer is arranged between the carrier and the adhesive layer. A "substantially solid" formulation as used in the present disclosure means that the formulation is formulated to be about 100% solid without any solvent or water, such that substantially no VOC is released during printing and curing processes or when heated. That is, the label is made without using water.

In an embodiment, the at least one substantially solid ink formulation may be formulated using an ink base formed by mixing at least one first component containing a hydroxyl functional group and at least one second component containing an isocyanate functional group. The first component may be selected from diols, polyols or mixtures thereof, and the second component may be selected from diisocyanates, polyisocyanates, or mixtures thereof. For example, the first component may include castor oil. In an embodiment, the at least one substantially solid ink formulation may comprise an ink base formed from castor oil and an isocyanate crosslinker.

In some embodiments, the at least one substantially solid ink formulation may comprise a polyurethane ink base, a polyamide ink base, polyester ink base, or polyether ink base.

The substantially solid heat activated adhesive formulation may be a hot melt adhesive powder or a mixture of hot melt adhesive powders. The substantially solid heat activated adhesive formulation may comprise a substantially solid ink formulation and at least one hot melt adhesive powder. In embodiments, the substantially solid ink formulation can be a clear ink.

In an embodiment, the substantially solid heat activated adhesive may be formulated using an ink base formed by mixing at least one first component containing a hydroxyl functional group and at least one second component containing an isocyanate functional group, wherein the first component may be selected from diols, polyols or mixtures thereof, and the second component may be selected from diisocyanates, polyisocyanates, or a mixture thereof. In such an embodiment, the first component may include castor oil. In an embodiment, the substantially solid heat activated adhesive formulation may comprise a clear ink base formed from castor oil and an isocyanate crosslinker.

In an embodiment, the heat transfer label may also include a dye migration resistant layer arranged between the graphic layer and the adhesive layer. The dye migration resistant layer may be formed from a substantially solid dye resistant formulation comprising activated carbon and an ink base formed from at least one first component containing a hydroxyl functional group and at least one second component containing an isocyanate functional group, wherein the first component may be selected from diols, polyols or mixtures thereof, and the second component may be selected from diisocyanates, polyisocyanates, or a mixture thereof.

The heat transfer label may be configured such that the graphic layer and the adhesive layer transfer to a substrate upon application of heat and pressure, wherein the graphic layer is attached to the substrate by the adhesive layer. In an embodiment, the graphic layer and the adhesive layer may be printed using a screen printing process.

Other aspects, objectives and advantages will become more apparent from the following detailed description when taken in conjunction with the accompanying drawings.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
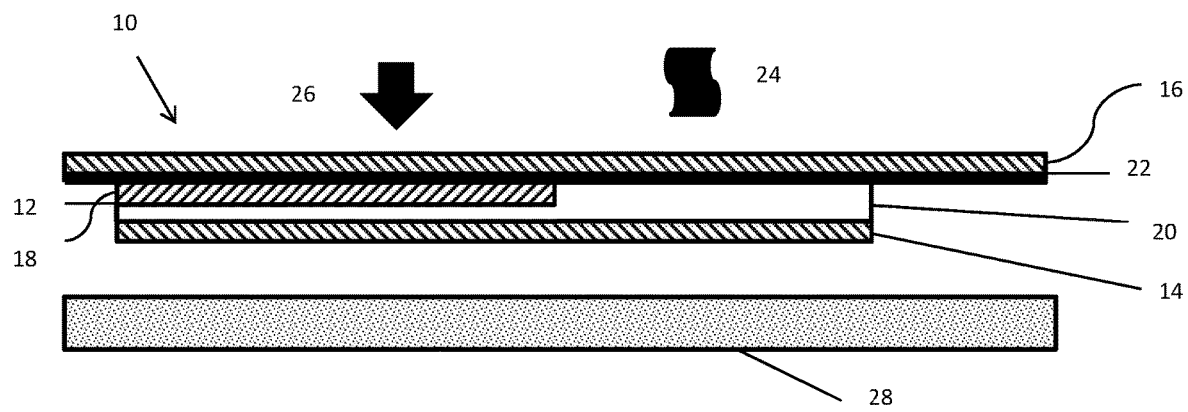
FIG. 1 is a schematic cross sectional view of a heat transfer label according to an embodiment.

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated. The words "a" or "an" are to be taken to include both the singular and the plural. Conversely, any reference to plural items shall, where appropriate, include the singular.

Figure 2:
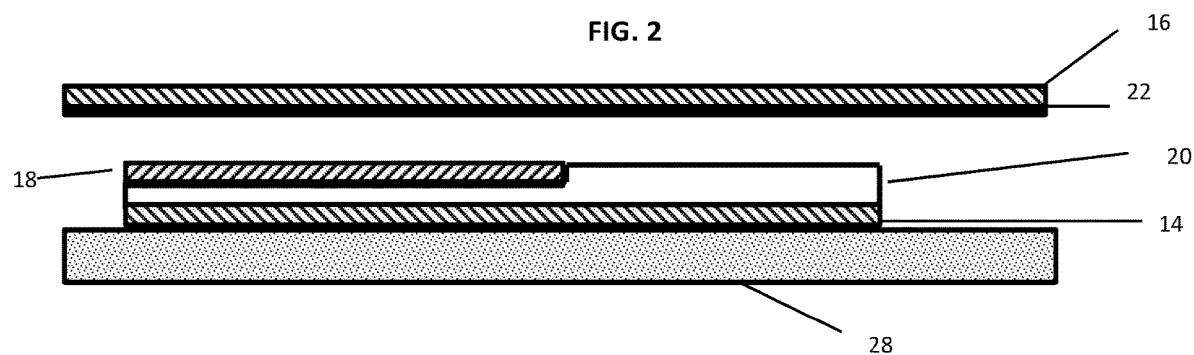
FIG. 2 is a schematic cross sectional view of the heat transfer label of FIG. 1 transferred to a substrate.
Figure 3:
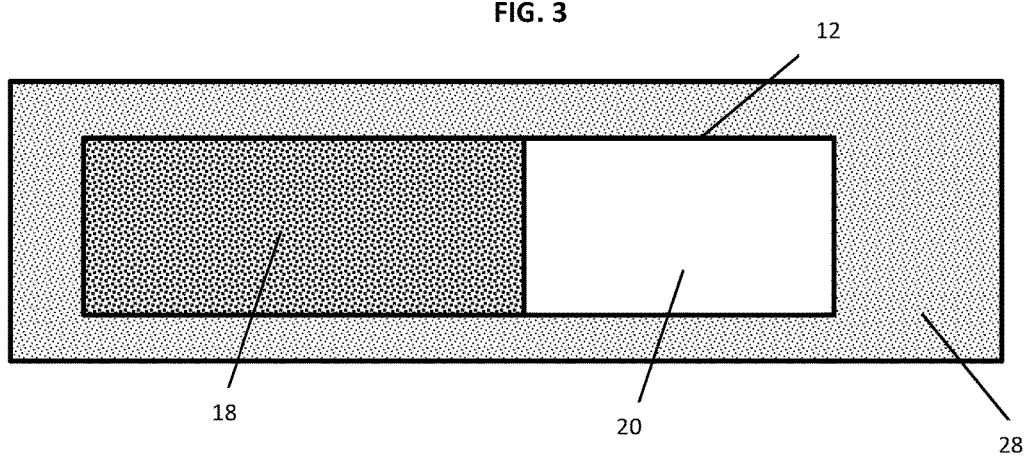
FIG. 3 is a schematic top view of the heat transfer label of FIG. 1 on the substrate after a carrier is peeled off.

Referring to the figures, FIGS. 1-3 illustrate a heat transfer label 10 according to an embodiment. The heat transfer label 10 may be configured to be substantially free of volatile organic compounds (VOC) and water, generally including a graphic layer 12, an adhesive layer 14 and a carrier 16. Being substantially free of water means that the label is made without the use of water. In the figures, layer thicknesses are exaggerated for easy understanding and are not proportional. The graphic layer 12 may include ink layers 18, 20 formed from at least one substantially solid ink formulation configured to provide improved properties for the heat transfer label, such as better flexibility and elastic properties, when compared to inks formulated with polymers having acrylate or methacrylate backbones. Further, the adhesive layer 14 may be formed from a substantially solid adhesive formulation.

In the embodiment of FIGS. 1-3, the graphic layer 12 includes two ink layers 18, 20 for a two-color design. In other embodiments, the graphic layer 12 may include one ink layer for a single-color design or more than two different color ink layers for a multicolor design. The graphic layer 12 may also include a top protective layer and/or a backing layer, such as a white backing layer. The first ink layer 18 may be a first color ink, e.g. yellow, and the second ink layer 20 may be a second color ink, e.g. white. In such an embodiment, a white color ink may be used as a back-up color to enhance the richness of the color of the first ink layer. For example, the white color ink may be used as the second ink layer 20 when the heat transfer label 10 having a lighter color ink as the first ink layer 18 is configured to be applied to darker colored substrates.

The ink layers 18, 20 of the graphic layer 12 may be formed from at least one ink formulation, which is about 100% solid and substantially free of VOC and water. The ink formulations may be configured to be cured by a condensation reaction to yield dry, solid ink layers. For example, the graphic layer 12 may be formed from polyurethane ink formulations that are substantially solid and substantially free of VOC and water (e.g., made without water). An ink base for such solid ink formulations may be prepared by mixing components containing hydroxyl functional groups with components containing isocyanate functional groups. In such an embodiment, the hydroxyl functional group and the isocyanate functional group may react to form a condensation polymer, such as polyurethane.

Suitable materials for the ink base components containing hydroxyl functional groups may include, but are not limited to, diols, polyols, and mixtures thereof. For example, castor oil is a commercially available natural oil that is suitable for the hydroxyl functional group containing component. Other natural oils suitable for the hydroxyl functional group containing component may include, but are not limited to, cashew nut oil and other similar natural oil polyols (NOP) or biopolyols, which may be modified to include hydroxyl groups. Suitable materials for the components containing isocyanate functional groups may include, but are not limited to, diisocyanates, polyisocyanates, and mixtures thereof. In some embodiments, monomeric alcohols may be added to control polymeric chain growth. Further, catalysts may also be added to accelerate the reaction, or blocked isocyanates may be used to inhibit the reaction until the isocyanates are unblocked.

The ink formulations formulated with such an ink base may yield flexible ink layers having excellent elastic properties, which may be stretched without fracturing and may return to their original shape after stretching. Such ink formulations may be well suited for labels used on apparel items, such as sports apparel. In other embodiments, the ink formulations may be modified by altering one or more components, for example, substituting aromatic counterparts to the aliphatic components, to provide hard, durable ink layers for application to rigid substrates, such as plastic jars and bottles, painted metal, and glasses. The ink formulations may be configured to cure at room temperature, such that the ink layers may be formed without heat and air flow as in a convection drying oven for curing solvent based inks or water based inks.

Other types of condensation reaction products or step growth polymerization products, such as polyamide, polyester, and polyether may be used as an ink base. Other suitable condensation reaction products that are suitable for the ink base may include, but are not limited to, reaction products between hydroxyls and carboxylic acids, reaction products between amines and epoxides, reaction products between amines and isocyanates, reaction products between amines and carboxylic acids, reaction products between hydroxyls and epoxides, and the likes. Copolymers formed from combinations of various raw materials may also be used as an ink base.

The ink bases prepared according to the foregoing embodiments may be used to formulate different color inks by adding various colorants, such as organic pigments, inorganic pigments, dyes, and the like. In some embodiments, an ink may be formulated with a mixture of different colorants. The ink bases may also be formulated with other additives. For example, the ink bases may be formulated with activated carbon to form a protective layer to block dye migration from a colored substrate 28 into the ink layers 18, 20. The ink bases may also be formulated with a suitable hot melt adhesive powder, which may be used to form the adhesive layer 14.

The adhesive layer 14 may be formed from a substantially solid heat activated adhesive, which softens and forms a permanent bond with a substrate 28 when subjected to heat 24 and pressure 26. In an embodiment, a hot melt adhesive powder or a mixture of hot melt adhesive powders may be incorporated into a liquid ink formulation, such as the ink bases prepared according to the foregoing embodiments, and screen printed over the graphic layer 12 to form the adhesive layer 14. The ink may be clear or pigmented/tinted. For apparel applications, the adhesive layer 14 may be configured to have a substantially greater thickness than the graphic layer 12. For example, the adhesive layer 14 can have a thickness of about 50-100 μm.

In another embodiment, the hot melt adhesive powder may be spread over a wet pass of an ink layer followed by curing of the ink layer, which may be followed by a second heat treatment to melt the hot melt adhesive powder to form a substantially uniform layer of hot melt adhesive. Such a sintering step may be carried out at temperatures determined according to the melt temperatures of the hot melt adhesive powders. Suitable hot melt adhesive powders include, but are not limited to, copolyester based hot melt adhesive, copolyamide hot melt adhesive, and polyurethane hot melt powder. In some embodiments, the heat transfer label 10 may be configured without a separate adhesive layer. In such embodiments, the ink layers 18, 20 of the graphic layer 12 may be formulated to provide adhesion to a substrate 28.

The graphic layer 12 and the adhesive layer 14 may be printed on the carrier 16, for example, via a screen printing process. In such an embodiment, the graphic layer 12 may be printed on the carrier 16 first, and the adhesive layer 14 may be subsequently printed over the graphic layer 12. The graphic layer 12 and the adhesive layer 14 may also be printed using other conventional printing methods, such as flexographic, rotogravure, or pad printing methods. The graphic layer 12 and the adhesive layer 14 may be printed via a single or multiple printing passes. In some embodiments, the graphic layer 12 may be printed via multiple passes to provide a multi-color design. Further, the graphic layer 12 may also include a protective layer and/or a backing layer, which may be printed by additional printing passes. In some embodiments, the graphic layer 12 can include more than one backer colors.

The graphic layer 12 may be configured such that the affinity between the ink layers 18, 20, i.e. the inter-coat adhesion between the ink layers 18, 20, is greater than the affinity of either of the ink layers 18, 20 to the carrier 16 or the release layer 22, such that the graphic layer 12 and the adhesive layer 14 may transfer to a substrate 28 when subjected to heat 24 and pressure 26. Further, the affinity between the ink layers 18, 20 and the adhesive layer 14 may be configured to be greater than the affinity of the ink layers 18, 20 for the carrier 16 or the release layer 22.

The carrier 16 may be formed from a suitable material, such as a paper or a polymeric film. Suitable polymeric films for the carrier 16 may include a polypropylene film and a polyester film, with polyester being more heat resistant. MYLAR® and MELINEX® are two trademarks under which these materials are commercially available. Paper may be less costly than plastic films. However, the dimensional stability of paper may be less desirable unless printing is conducted in a controlled environment with regard to temperature and relative humidity. The gloss of the heat transfer label 10 after application to a substrate may be controlled by the gloss of the carrier 16. For example, a carrier having a flat and smooth printing surface may provide a glossy graphic layer, while a carrier having a matte printing surface may provide a graphic layer having a matter surface.

In some embodiments, the carrier 16 may be coated with a release layer 22. The release layer 22 may be formed from a silicone based material or other coating materials having a low surface tension. In an embodiment, both sides of the carrier 16 may be coated with release coatings, wherein the release coatings have different release characteristics. For example, the printed side may have a tighter release than the non-printed side.

In use, the heat transfer label 10 may be placed on a substrate 28, for example, a shirt fabric, such that the adhesive layer 14 faces the substrate 28 as shown in FIG. 1. To transfer the label, heat 24 and pressure 26 may be applied over the carrier 16 with a label applicator. When heat 24 and pressure 26 are applied, the adhesive layer 14 may soften and adhere to the substrate 28 permanently. Subsequently, the carrier 16 may be peeled off. Since the adhesion strength between the graphic layer 12 and the adhesive layer 14 is greater than that between the graphic layer 12 and the carrier 16 and/or the release layer 22, the graphic layer 12 remains attached to the adhesive layer 14, and transfers to the substrate 28. As shown in FIG. 2, the release layer 22 remains bonded to the carrier 16 and stripped away from the graphic layer 12 when the carrier 16 is peeled away.

FIG. 3 is a schematic top view of the graphic layer 12 attached to the substrate 28. In this embodiment, the graphic layer 12 is illustrated as a two-color design including two ink layers 18, 20. In other embodiments, the graphic layer 12 may include a one ink layer for a single-color design, or may include more than two ink layers for a multi-color design.

Figure 4:
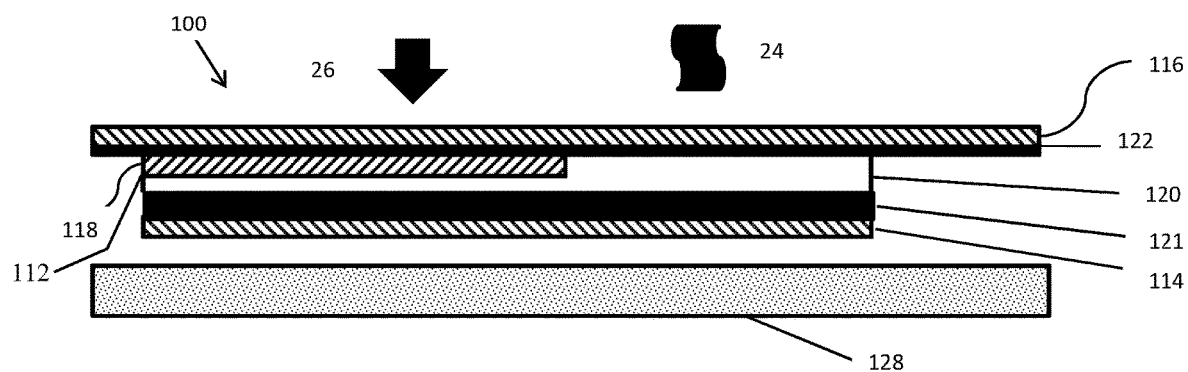
FIG. 4 is a schematic cross sectional view a heat transfer label according to another embodiment.
Figure 5:
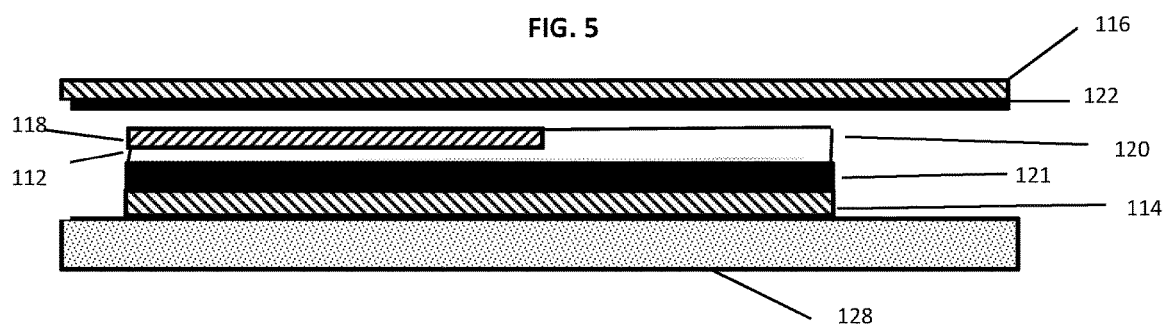
FIG. 5 is a schematic cross sectional view of the heat transfer label of FIG. 4 transferred to a substrate.
Figure 6:
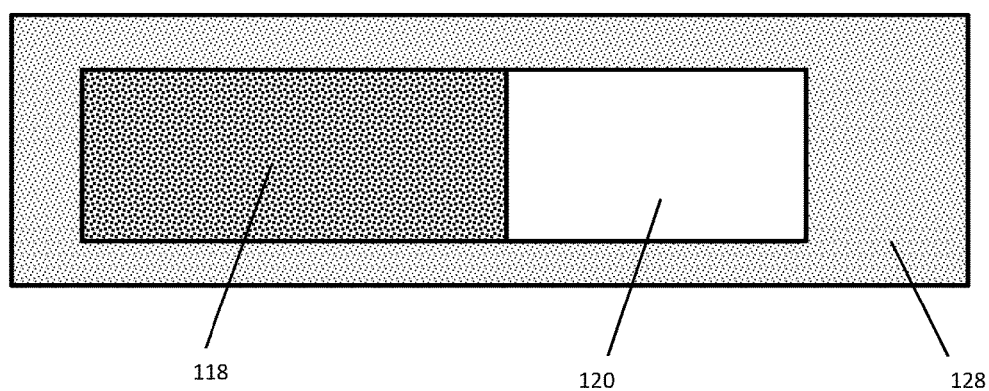
FIG. 6 is a schematic top view of the heat transfer label of FIG. 4 on the substrate after a carrier is peeled off.

A heat transfer label 100 according to another embodiment is illustrated in FIGS. 4-6. The heat transfer label 100 is configured similar to the heat transfer label 10 of FIGS. 1-3 generally comprising a graphic layer 112 including ink layers 118, 120, an adhesive layer 114, and a carrier 116. In this embodiment, the heat transfer label further includes a dye migration resistant layer 121 arranged between the graphic layer 112 and the adhesive layer 114. The dye migration resistant layer 121 may be formulated to absorb or block migration of dyes from a substrate into the graphic layer 112.

In an embodiment, the heat transfer label 100 may be configured as an apparel label for apparel made with fabric that has been colored with migration susceptible dyes. In such an embodiment, the dye migration resistant layer 121 may be configured to block dye migration from the fabric substrate, for example, a fabric colored with a red dye, into the ink layer 120, which may be formed from a white ink formulation, preventing the ink layer 120 from becoming a pink background layer instead of a white background layer. In some embodiments, a heat transfer label may include more than one dye migration resistant layers.

The dye migration resistant layer 121 may be formed from a substantially solid clear ink formulated with activated carbon, which is substantially free of VOC and water (that is, the solid clear ink formulation is made without the use of water). The heat transfer label 100 may be transferred to a substrate 128 when subjected to heat 24 and pressure 28, wherein the carrier 116 and a release layer 122 may be peeled off from the graphic layer 112.

Example of Ink Formulations:

TABLE 1

Formula 1 - Clear Base

| Raw Material Type | Weight Percent |
|---|---|
| Castor Oil-Based Resins[1] | 25-50% |
| Polyester Diol Resin[2] | 5-15% |
| Surface Tension Additive[3] | 1-2% |
| Defoaming Additive[3] | 1.5-3% |
| Moisture Scavenger[4] | 2-4% |
| Thixotropic Additive[5] | 0.3-0.6% |
| Aluminum Catalyst[6] | 1-2% |
| Cross-linked With | |
| HDI/IPDI Isocyanate Crosslinker[7] | 20-40% |
| TOTAL | 100% |

TABLE 2

Formula 2 - White

| Raw Material | Weight Percent |
|---|---|
| Castor Oil-Based Resins[1] | 25-40% |
| Polyester Diol Resin[2] | 2-10% |
| Surface Tension Additive[3] | 0.5-1% |
| Moisture Scavenger[4] | 1-2% |
| Titanium Dioxide Pigment[8] | 15-30% |
| Pigment Extender[9] | 10-20% |
| Defoaming Additive[3] | 2-3% |
| Aluminum Catalyst[6] | 2-3% |
| Cross-linked With | |
| HDI/IPDI Isocyanate Crosslinker[7] | 15-30% |
| TOTAL | 100% |

TABLE 3

Formula 3 - Clear Base

| Raw Material | Weight Percent |
|---|---|
| Cashew Shell Resin[10] | 20-40% |
| Polyester Diol Resin[2] | 10-20% |
| Castor Oil-Based Resins[1] | 10-20% |
| Surface Tension Additive[3] | 0.5-1% |
| Defoaming Additive[3] | 1-2% |
| Thixotropic Additive[5] | 0.5-1% |
| Aluminum Catalyst[6] | 1-2% |
| Cross-linked With | |
| HDI/IPDI Isocyanate Crosslinker[7] | 25-50% |
| TOTAL | 100% |

Manufacturers of Chemicals Listed:
1. Sigma-Aldrich, Nivapol, Arista Industries, Cardolite Corporation, allnex, Vertellus
2. Perstorp, King Industries, UBE Corporation, Michelman, Lanxess, Evonik, Covestro
3. Evonik, King Industries, Dow, BASF, BYK
4. Tosoh, BASF, Lubrizol, Incorez, OMG Borchers, Momentive
5. Evonik, King Industries, Cabot, Elementis, BYK
6. Evonik, Lanxess, King Industries
7. Evonik, BASF, Covestro, Huntsman, DSM, Vencorex
8. BASF, Chemours, Chromaflo Corporation, Clariant, Elementis, Huntsman, Sachtleben
9. Grace, Huber, Venator, Sachtleben, Cimbar, Imerys
10. Golden Cashew, Aturex, Huntsman, Cardolite Corporation The clear base formulations of TABLE 1 and 3 (Formula 1 and Formula 3) may be used to formulate ink formulations for the ink layers 18, 20, 118, 120, adhesive formulations for the adhesive layers 14, 114, and dye resistive formulations for the dye migration resistant layer 121. The white ink formulation of TABLE 2 (Formula 2) may be used to form a backing layer of the graphic layer 12, 112, or any of the ink layers 18, 20, 118, 120.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A heat transfer label, comprising:
   a carrier;
   a graphic layer provided on the carrier, the graphic layer including at least one ink layer formed from at least one solid ink formulation, the at least one solid ink formulation is formulated using an ink base formed by mixing at least one first component containing a hydroxyl functional group and at least one second component containing an isocyanate functional group, and at least one second component containing an isocyanate functional group, the hydroxyl functional group being a diol, polyol or a mixture thereof, and the isocyanate functional group being diisocyanate, polyisocyanate, or a mixture thereof; and
   an adhesive layer formed from a solid heat activated adhesive formulation, wherein the graphic layer is arranged between the carrier and the adhesive layer;
   wherein the heat transfer label is configured to be free of volatile organic compounds (VOC).

2. The heat transfer label of claim 1, wherein the first component includes castor oil.

3. The heat transfer label of claim 1, wherein the at least one solid ink formulation is formulated with a polyurethane ink base.

4. The heat transfer label of claim 1, wherein the at least one solid ink formulation is formulated with a polyamide ink base, polyester ink base, or polyether ink base.

5. The heat transfer label of claim 1, wherein the solid heat activated adhesive formulation is a hot melt adhesive powder or a mixture of hot melt adhesive powders.

6. The heat transfer label of claim 1, wherein the solid heat activated adhesive formulation comprise a solid ink formulation and at least one hot melt adhesive powder.

7. The heat transfer label of claim 6, wherein the solid ink formulation is a solid clear ink formulation.

8. The heat transfer label of claim 1, further including a dye migration resistant layer arranged between the graphic layer and the adhesive layer, wherein the dye migration resistant layer is formed from a solid dye resistant formulation formulated using an ink base and activated carbon.

9. The heat transfer label of claim 1, wherein the heat transfer label is configured such that the graphic layer and the adhesive layer transfer to a substrate upon application of heat and pressure, wherein the graphic layer is attached to the substrate by the adhesive layer.

10. The heat transfer label of claim 1, wherein the graphic layer and the adhesive layer is printed using a screen printing process.

11. The heat transfer label of claim 1, wherein the at least one substantially solid ink formulation comprises castor oil and an isocyanate crosslinker.

\* \* \* \* \*